United States Patent
Onuki

(10) Patent No.: US 9,413,910 B2
(45) Date of Patent: Aug. 9, 2016

(54) APPARATUS AND METHOD FOR READING AND RECORDING IMAGE

(71) Applicant: CANON KABUSHIKI KAISHA, Tokyo (JP)

(72) Inventor: Kazuhiko Onuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/622,663

(22) Filed: Feb. 13, 2015

(65) Prior Publication Data
US 2015/0237221 A1 Aug. 20, 2015

(30) Foreign Application Priority Data
Feb. 18, 2014 (JP) .................................. 2014-028074

(51) Int. Cl.
*H04N 1/04* (2006.01)
*H04N 1/00* (2006.01)

(52) U.S. Cl.
CPC .................................. *H04N 1/0057* (2013.01)

(58) Field of Classification Search
CPC .................................................. H04N 1/0057
USPC .......... 358/474, 496, 498, 488, 401, 501, 505
See application file for complete search history.

(56) References Cited

U.S. PATENT DOCUMENTS

| 4,961,090 | A | * | 10/1990 | Gray, Jr. | G03G 15/041 355/50 |
|---|---|---|---|---|---|
| 4,996,556 | A | * | 2/1991 | Gray, Jr. | G03B 27/625 355/50 |
| 5,207,417 | A | * | 5/1993 | Bell | B65H 29/40 271/175 |
| 6,057,936 | A | | 5/2000 | Obara | |
| 8,387,973 | B1 | * | 3/2013 | Fernandez | B26D 5/00 271/175 |
| 2008/0213024 | A1 | * | 9/2008 | Onuki | B41J 3/4078 400/578 |
| 2009/0127770 | A1 | * | 5/2009 | Tamaki | B65H 31/02 271/207 |
| 2011/0222948 | A1 | * | 9/2011 | Asada | B41J 3/4073 400/611 |
| 2012/0002230 | A1 | * | 1/2012 | Yamazaki | B41J 3/60 358/1.13 |
| 2013/0094066 | A1 | * | 4/2013 | Sakanashi | H04N 1/1013 358/449 |
| 2013/0163021 | A1 | * | 6/2013 | Kinoshita | H04N 1/02815 358/1.13 |
| 2014/0347712 | A1 | * | 11/2014 | Yoneyama | H04N 1/00816 358/498 |

* cited by examiner

*Primary Examiner* — Cheukfan Lee
(74) *Attorney, Agent, or Firm* — Canon USA Inc. IP Division

(57) ABSTRACT

An image reading and recording apparatus includes a reading unit, a recording unit, and a movable member. The movable member is configured to select a discharge way of the document discharged from the reading unit from at least a first discharge way in which the document is discharged into a space between the reading unit and the recording unit and a second discharge way in which the document is discharged to a side of the recording unit.

15 Claims, 10 Drawing Sheets

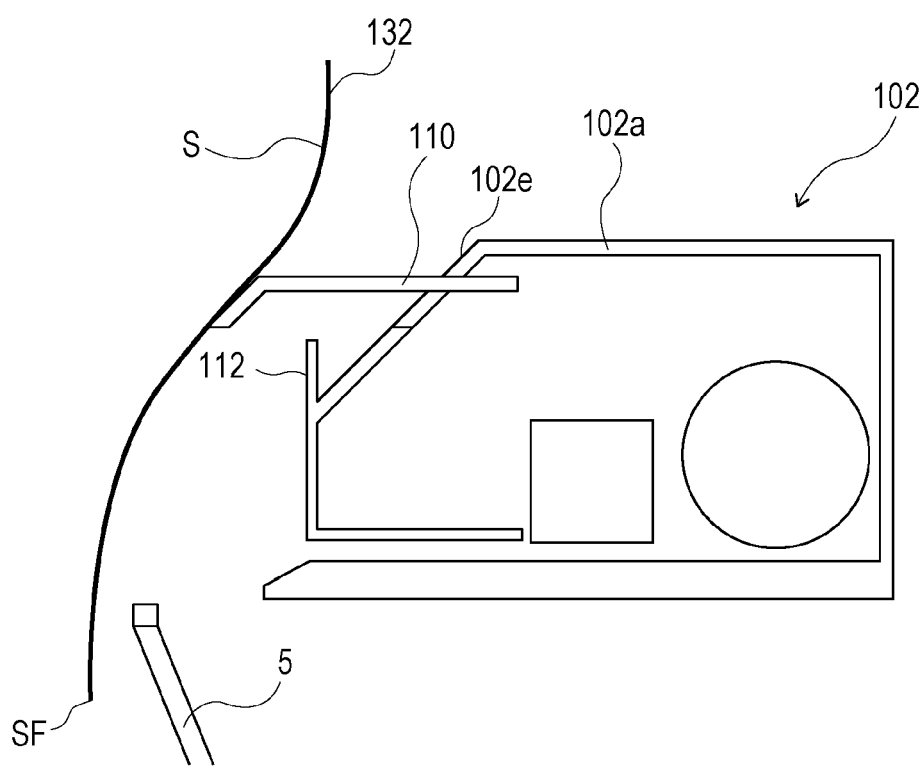

APPARATUS AND METHOD FOR READING AND RECORDING IMAGE

BACKGROUND OF THE INVENTION

1. Field of the Invention

The present invention relates to an image reading and recording apparatus including a reading unit that reads an image of a document and a recording unit that records the image and to a method for reading a document and recording it, and in particular, to a mechanism for discharging the read document.

2. Description of the Related Art

A known image reading and recording apparatus in the related art reads an image of a document using a reading unit and records the read image on a recording medium using a recording unit. In such an image reading and recording apparatus, the reading unit is disposed above the recording unit. This is because the reading unit needs a height and space for an operator to easily insert a document into a paper port.

Discharging a read document and a recorded medium to separate accommodating units needs a wide space. In particular, a large-format apparatus in which large-sized documents and large-sized recording media are used needs a very large accommodating unit, which makes it difficult to decrease the size and simplify the apparatus To prevent it, another known apparatus discharges a read document to an accommodating unit for recorded media. In such apparatuses, read documents and recorded media are generally discharged forward of the apparatuses to enhance the collection performance.

SUMMARY OF THE INVENTION

The present invention provides a compact image reading and recording apparatus with a simple configuration in which a document and a recording medium can be discharged in parallel, and in which an adverse effect on a recorded medium and a read document can be reduced.

An apparatus for reading and recording an image according to an aspect of the present invention includes a reading unit configured to read an image of a document while conveying the document and discharge the document downwards by gravitation; a recording unit located below the reading unit, the recording unit recording the image on a recording medium while conveying the recording medium and discharging the recording medium downwards by gravitation; and a movable member configured to select a discharge way of the document discharged from the reading unit from at least a first discharge way in which the document is discharged into a space between the reading unit and the recording unit and a second discharge way in which the document is discharged to a side of the recording unit.

According to the aspect of the present invention, it is possible to prevent the interference between the discharged document and the recording medium. Thus, according to the aspect of the present invention, the document and the recording medium can be discharged in parallel, and an adverse effect on the recorded medium can be reduced.

Further features of the present invention will become apparent from the following description of exemplary embodiments with reference to the attached drawings.

BRIEF DESCRIPTION OF THE DRAWINGS

FIG. 11 is a cross-sectional view of the second embodiment, corresponding to FIG. 6.

DESCRIPTION OF THE EMBODIMENTS

First Embodiment

An image reading and recording apparatus according to a first embodiment of the present invention will be described hereinbelow with reference to the drawings.

Figure 1:
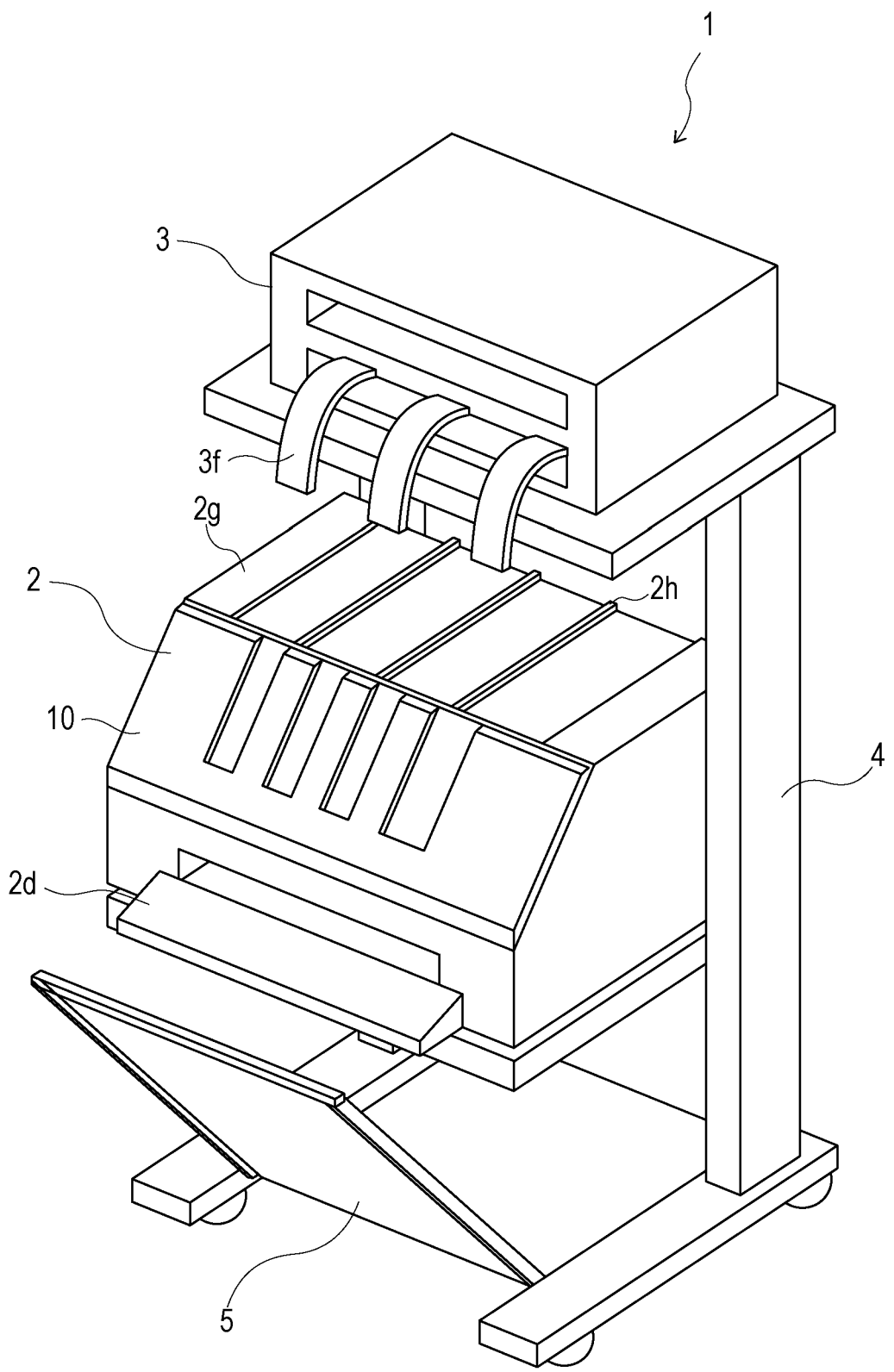
FIG. 1 is a perspective view of an image reading and recording apparatus according to an embodiment of the present invention.

FIG. 1 is a perspective view of an image reading and recording apparatus 1. The image reading and recording apparatus 1 includes a recording unit 2 configured as an inkjet printer and a document reading unit 3 configured as a scanner. The image reading and recording apparatus 1 further includes an apparatus stand 4 and an accommodating unit 5 that selectively accommodates read documents and recording media on which images are recorded. The recording unit 2 and the reading unit 3 are placed on the apparatus stand 4, and the accommodating unit 5 is attached to the apparatus stand 4. The recording unit 2 is located below the reading unit 3, and the accommodating unit 5 is located below the recording unit 2.

FIGS. 2 to 6 are cross-sectional views of the image reading and recording apparatus 1 shown in FIG. 1. The recording unit 2 includes a paper feeding section 2b, a recording section 2c, and a paper ejecting section 2d, which are covered with a casing 2a. The reading unit 3 includes a paper feeding section 3b, a document reading section 3c, a paper ejection roller pair 3d, and a paper ejecting section 3e, which are covered with a casing 3a. A recording medium P is rolled around the paper feeding section 2b. The recording medium P is conveyed in order of the paper feeding section 2b, the recording section 2c, and the paper ejecting section 2d of the recording unit 2 and is accommodated in the accommodating unit 5. A document S is conveyed in order of the paper feeding section 3b, the document reading section 3c, the paper ejection roller pair 3d, and the paper ejecting section 3e of the reading unit 3. The paper ejection roller pair 3d conveys the document S and ejects it to the paper ejecting section 3e. The ejected document S is guided downwards by a guide member 3f provided outside the casing 2a.

Figure 2:
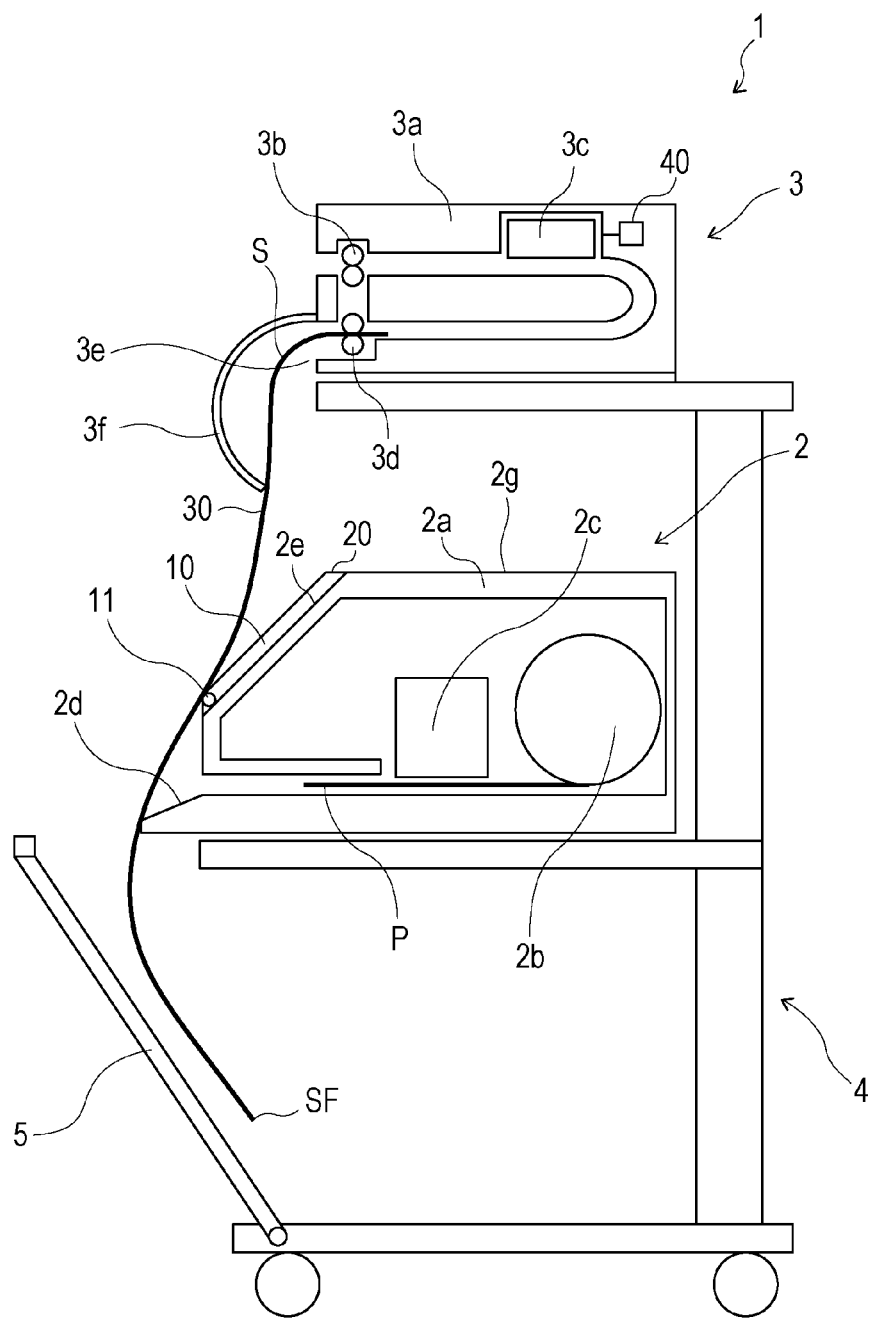
FIG. 2 is a cross-sectional view showing a state in which a document is discharged along a reference discharge path.
Figure 3:
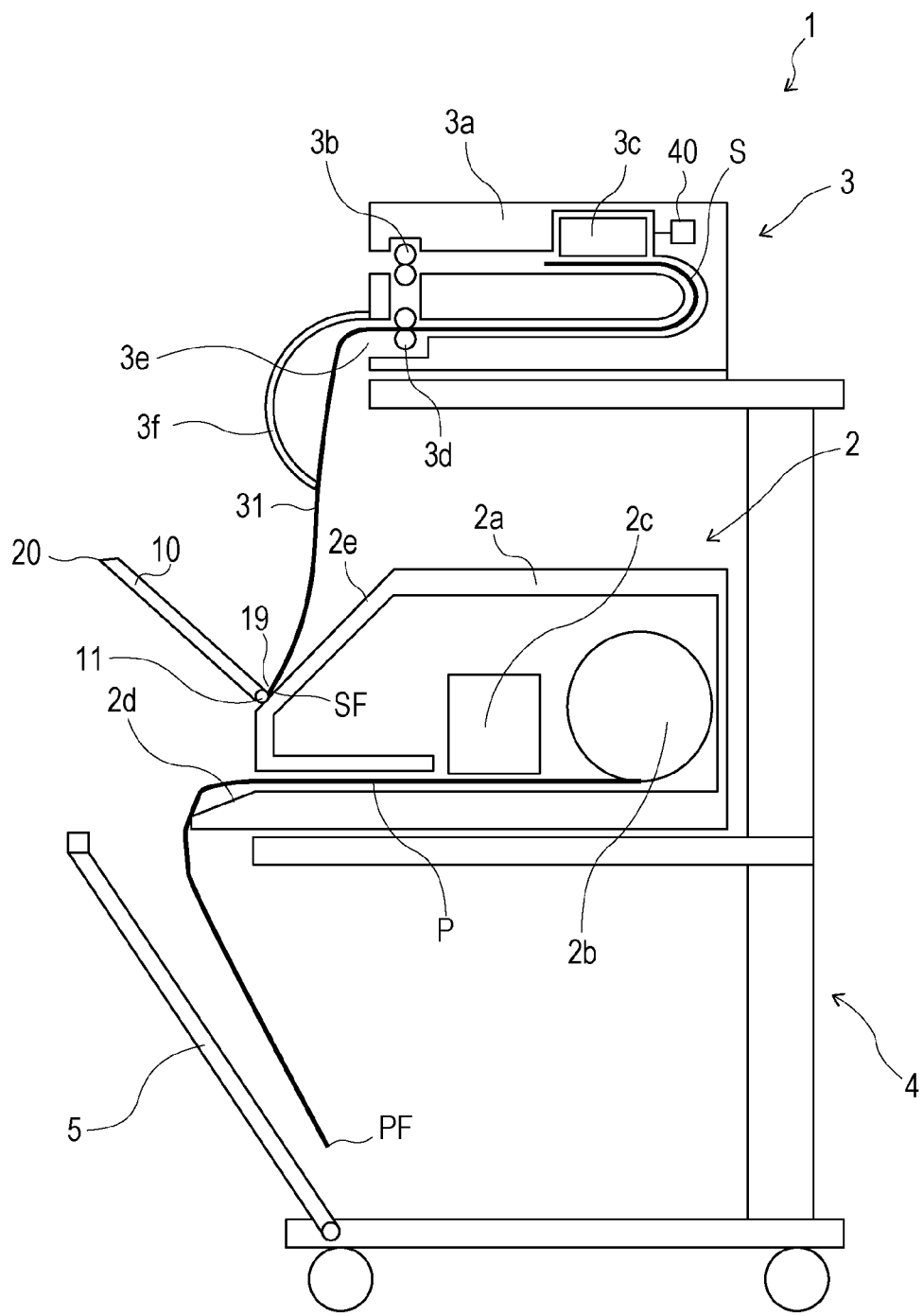
FIG. 3 is a cross-sectional view showing a state in which a document is discharged along a first discharge path.
Figure 4:
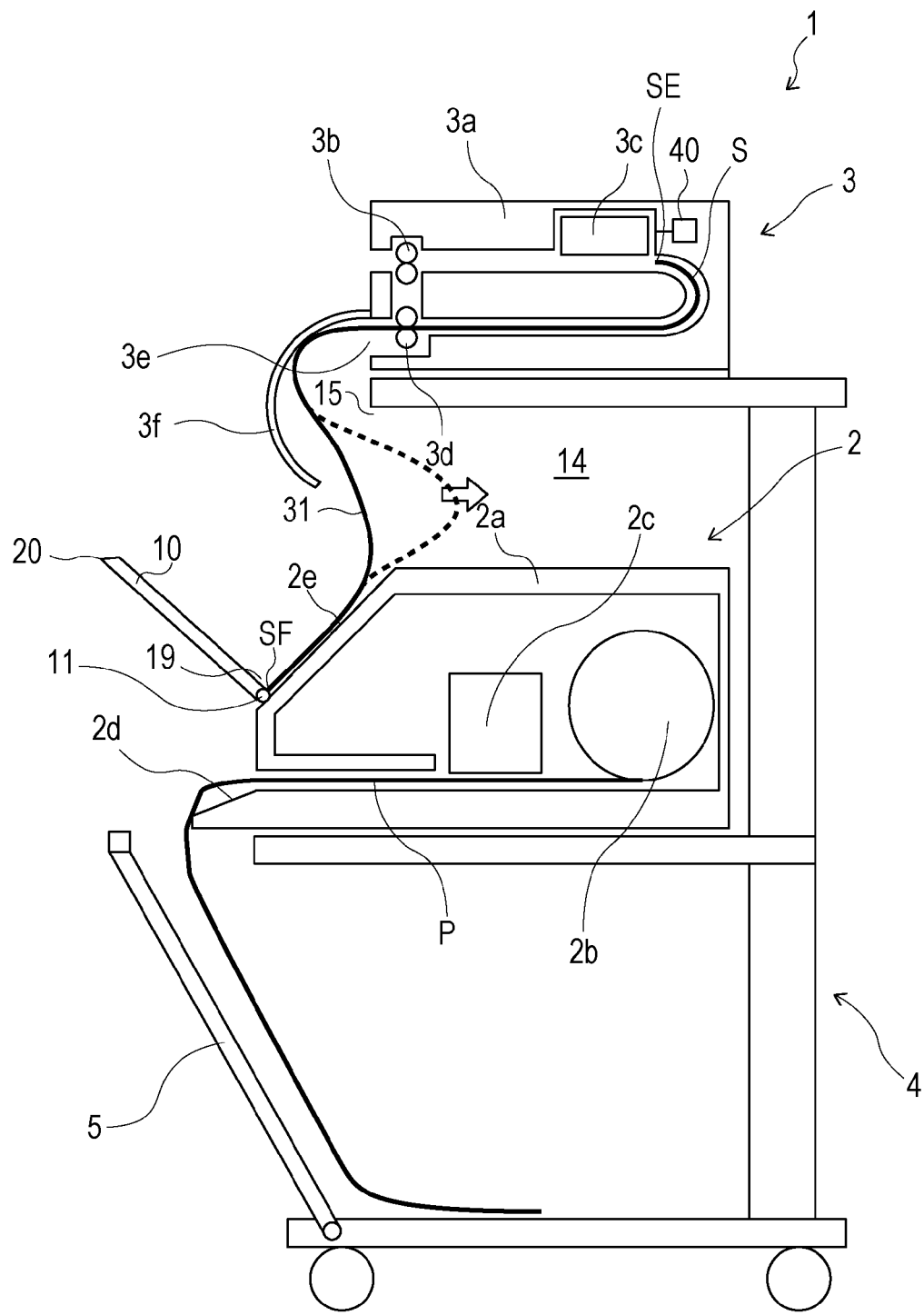
FIG. 4 is a cross-sectional view showing a state in which the document is discharged along the first discharge path.
Figure 5:
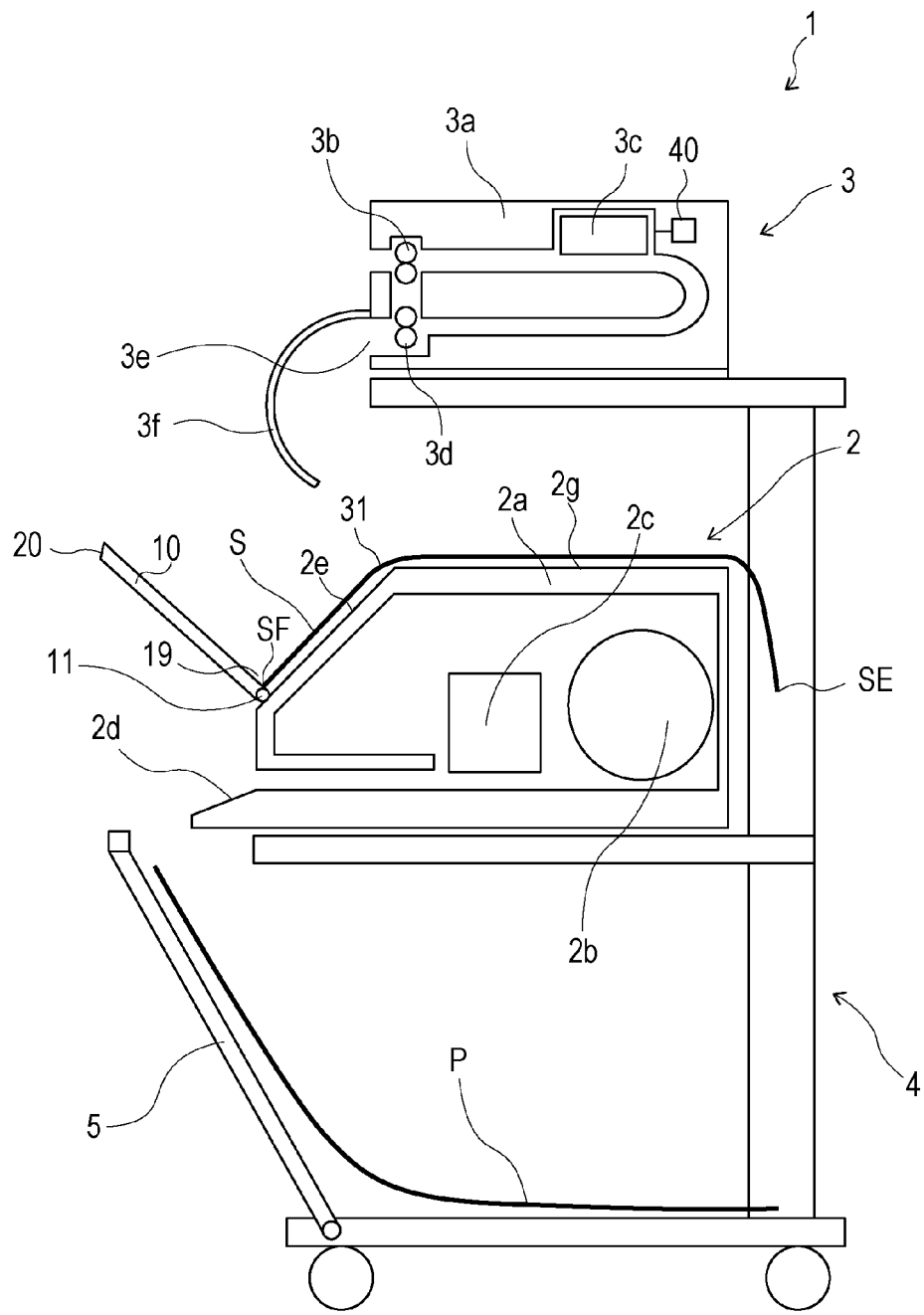
FIG. 5 is a cross-sectional view showing a state in which the document is discharged along the first discharge path.
Figure 6:
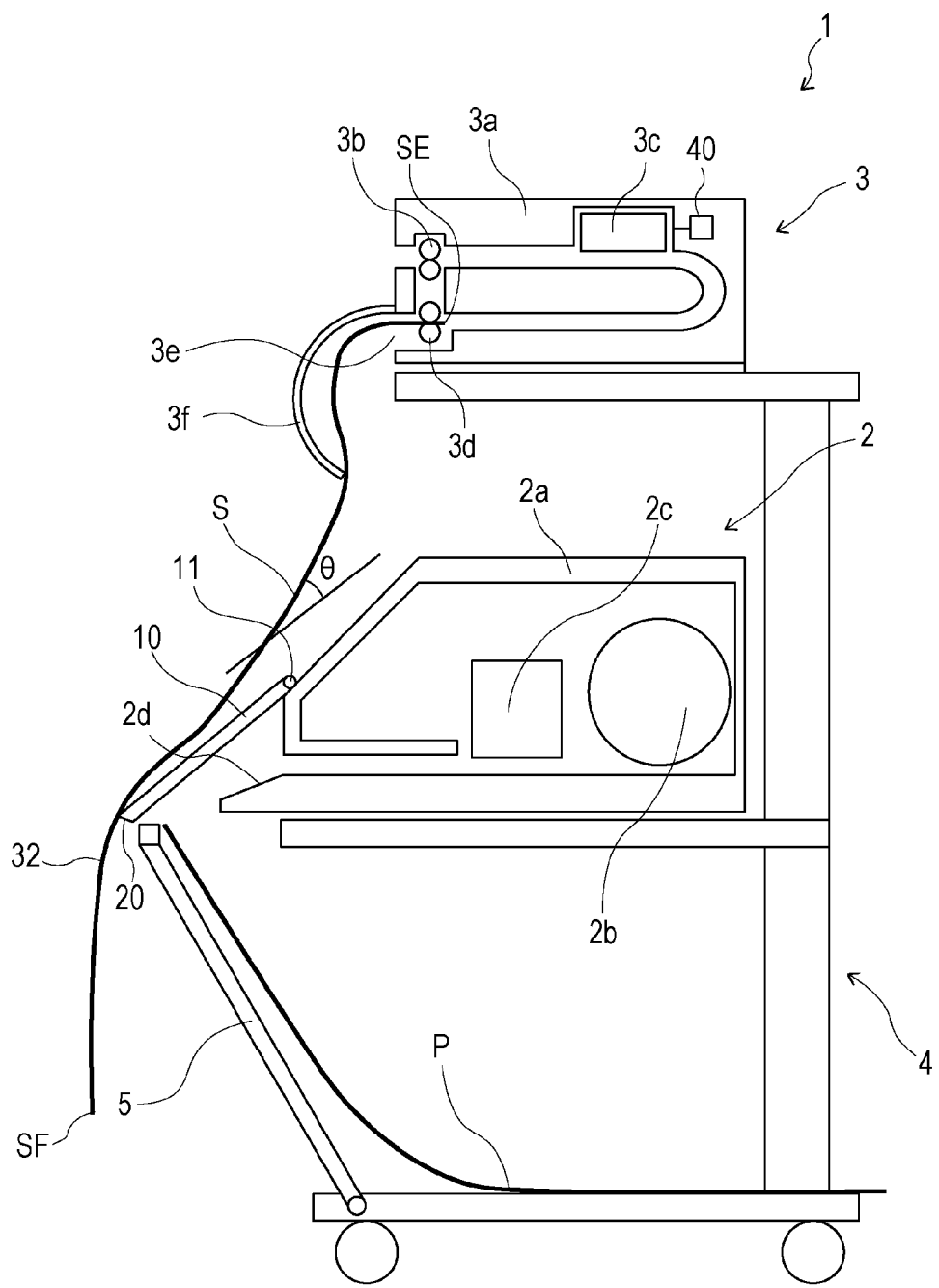
FIG. 6 is a cross-sectional view showing a state in which the document is discharged along a second discharge path.

The recording unit 2 has a movable member 10 above the paper ejecting section 2d. The movable member 10 is mounted on a front surface 2e of the casing 2a of the recording unit 2 and has a comb shape as shown in FIG. 1. The movable member 10 can rotate about a rotation shaft 11 with respect to the casing 2a among a reference rotational position (also referred to as a reference position) a first rotational position (also referred to as a first position), and a second rotational position (also referred to as a second position) and can be held at the individual rotational positions. Thus, the movable member 10 operates so that the document S selectively takes one of a reference discharge path 30 (a third discharge way) corresponding to the reference rotational position, a first discharge path 31 (a first discharge way) corresponding to the first rotational position, and a second discharge path 32 (a second discharge way) corresponding to the second rotational position. The reference rotational position and the reference discharge path 30 are shown in FIG. 2. The first rotational position and the first discharge path 31 are shown in FIGS. 3 to 5. The second rotational position and the second discharge path 32 are shown in FIG. 6.

Subsequently, the operation of the reading unit 3 of the image reading and recording apparatus 1 will be described. FIG. 2 shows a state in which the document S read by the reading unit 3 is discharged along the reference discharge path 30. The movable member 10 is located at the reference rotational position, that is, in an orientation in which a front edge 20 thereof is located in a direction from which the document S is discharged with respect to the rotation shaft 11. The movable member 10 may be in close contact with the casing 2a of the recording unit 2. The document S placed in the reading unit 3 is conveyed to the document reading section 3c with the roller pair of the paper feeding section 3b, and an image of the document S is read by the document reading section 3c. When the document S is further conveyed, a front end SF of the document S is discharged outside the casing 3a through the paper ejection roller pair 3d and the paper ejecting section 3e. The document S is thereafter discharged downwards by gravitation. The document S is guided by a guide member 3f provided at the paper ejecting section 3e, and the front end SF of the document S is guided downwards toward the movable member 10. Since the movable member 10 is located at the reference rotational position, it does not obstruct the motion of the document S. Thus, the document S moves downwards along the front surface 2e of the casing 2a of the recording unit 2 and is accommodated in the accommodating unit 5 located below the recording unit 2.

FIG. 2 also shows a state of recording on the recording medium P with the recording unit 2. The recording unit 2 records an image transmitted from a personal computer (not shown) on the recording medium P at the recording section 2c while conveying the recording medium P. The recording medium P is discharged from the paper ejecting section 2d to the outside of the casing 2a of the recording unit 2 and is further discharged downwards by gravitation into the accommodating unit 5. Since the movable member 10 is held at the reference rotational position, the movable member 10 does not overhang the paper ejecting section 2d of the recording unit 2. This allows a user to easily check an image recorded on the recording medium P.

Although FIG. 2 shows a state in which the document S and the recording medium P are discharged at the same time for convenience sake, the document S and the recording medium P are not actually discharged at the same time. This is for the purpose of preventing the document S and the recording medium P from coming contact with each other to exert an influence on the printing on the recording medium P.

FIGS. 3 to 5 show the flow of the operation of recording an image of the document S read by the reading unit 3 onto the recording medium P with the recording unit 2. In contrast to FIG. 2, the document S is discharged along the first discharge path 31. The operation of the recording unit 2 and the motion of the recording medium P are the same as those described with reference to FIG. 2. However, since the movable member 10 separates the discharge path for the document S from the discharge path for the recording medium P, the recording operation of the recording unit 2 and the reading operation of the reading unit 3 are performed at the same time, and the discharge of the document S and the discharge of the recording medium P are performed in parallel.

Referring to FIG. 3, the movable member 10 is rotated from the reference rotational position shown in FIG. 2 counterclockwise about the rotation shaft 11 and is held at the first rotational position. At the first rotational position, the movable member 10 is in an orientation in which a holding portion 19 or a hollow pocket is formed between it and the front surface 2e of the recording unit 2. At the first rotational position, the front edge 20 is above the rotation shaft 11 to prevent the document S from dropping, although not particularly limited thereto.

The operation of the reading unit 3 is the same as that described with reference to FIG. 2. The motion of the document S is also the same as that described with reference to FIG. 2 until it passes through the paper ejecting section 3e and is discharged downwards by gravitation. The document S is thereafter guided by the guide member 3f provided at the paper ejecting section 3e, so that the front end SF of the document S is guided toward the movable member 10. The document S comes into contact with the movable member 10 at the first rotational position or the front surface 2e of the casing 2a, slips down along the movable member 10 or the front surface 2e of the casing 2a, and is held or restricted by the holding portion 19. The holding portion 19 is normally located at the lowermost portion of the hollow pocket formed by the movable member 10 and the front surface 2e of the recording unit 2, that is, in the vicinity of the rotation shaft 11.

On the other hand, with the recording unit 2, the image of the document S read at the document reading section 3c is recorded on the recording medium P at the recording section 2c. A front end PF of the recording medium P is discharged from the paper ejecting section 2d to the outside of the casing 2a of the recording unit 2 into the accommodating unit 5.

Referring to FIG. 4, the document S is further conveyed, and the reading at the document reading section 3c is completed. The document S is further discharged by the paper ejection roller pair 3d, with the front end SF restricted or held by the holding portion 19. The document S is discharged into a space 14 between the recording unit 2 and the reading unit 3 by the action of the guide member 3f and is conveyed in the space 14 while being deformed. In other words, since the document S is discharged from the paper ejection roller pair 3d, with the front end SF of the document S held by the holding portion 19, the document S is deformed in such a manner as to gradually expand to the right, as indicated by the broken line in FIG. 4. When the document S is further conveyed, the document S is guided in the space 14 between the recording unit 2 and the reading unit 3 in such a manner as to be pushed through an inlet 15 deep to the right in FIG. 4. Thus, the rear end SE of the document S is discharged outside the reading unit 3 through the paper ejection roller pair 3d.

On the other hand, in the recording unit 2, the image of the document S read at the document reading section 3c is recorded on the recording medium P at the recording section 2c, as described with reference to FIG. 3.

Referring to FIG. 5, when the rear end SE of the document S is discharged outside the reading unit 3, the rear end SE of the document S passes through the center thereof and moves to the right (deep in the space 14) due to the elastic restoring force of the document S itself. This eliminates the deformation of the document S, and the document S is finally placed on a top surface 2g of the casing 2a of the recording unit 2.

Since the front surface 2e of the casing 2a inclines, the front part of the document S is placed on the front surface 2e of the casing 2a, and the rear part of the document S hangs down to the back of the casing 2a. Thus, the document S longer than the depth of the top surface 2g of the casing 2a can be placed on the top surface 2g of the casing 2a.

As shown in FIG. 1, the top surface 2g of the casing 2a is provided with a plurality of ribs 2h extending in the conveying direction. In place of the ribs 2h, a recess may be provided at a front edge of the top surface 2g. This allows an operator to easily take out the placed document S.

On the other hand, in the recording unit 2, the recording medium P is cut with a cutter (not shown) and is accommodated in the accommodating unit 5. The recorded medium P is accommodated in the accommodating unit 5 without coming into contact with the document S. This prevents the recorded medium P from rubbing against the document S to cause image degradation.

FIG. 6 shows a state in which the document S having a length in a conveying direction equal to or larger than a predetermined value (a standard length) is being discharged. The document S is discharged along the second discharge path 32. The movable member 10 is further rotated from the first rotational position shown in FIGS. 3 to 5 counterclockwise about the rotation shaft 11 and is held at the second rotational position. At the second rotational position, the front edge 20 of the movable member 10 is located in the discharging direction of the document S with respect to the rotation shaft 11.

The document S placed in the reading unit 3 is conveyed to the document reading section 3c by the roller pair of the paper feeding section 3b, where an image is read. The front end SF of the document S is discharged outside the casing 3a through the paper ejection roller pair 3d and the paper ejecting section 3e. The document S is thereafter guided downwards by the guide member 3f provided at the paper ejecting section 3e.

When the movable member 10 is held at the first rotational position shown in FIGS. 3 to 5, the document S is guided onto the top surface 2g of the casing 2a of the recording unit 2. However, the document S having a length in a conveying direction equal to or larger than a predetermined value (a standard length) might not be placed on the top surface 2g of the casing 2a of the recording unit 2 in a good form as shown in FIG. 5. In other words, the rear end SE of the document S may slip down to the back of the recording unit 2, or the document S may be bent to overlap.

Thus, when the document S having a length in a conveying direction equal to or larger than a predetermined value is to be discharged, the movable member 10 is rotated to the second rotational position and held at the second rotational position. The second rotational position may be at an angle at which the pocket shown in FIGS. 3 to 5 is not formed, that is, an angle at which the front edge 20 of the movable member 10 is located lower the rotation shaft 11, although not particularly limited thereto. The movable member 10 may be rotated to a position at which the movable member 10 substantially closes the top of the accommodating unit 5, as shown in FIG. 6. Since an angle θ formed between the document S and the movable member 10 is small, the front end SF of the document S is not restricted by the movable member 10 when the front end SF of the document S comes into contact with the movable member 10. Thus, the document S is conveyed downwards along the movable member 10. Since the movable member 10 closes the top of the accommodating unit 5, the document S is guided to the outside of the accommodating unit 5 through a side of the recording unit 2. Upon completion of reading to the rear end SE of the document S at the document reading section 3c, the rotation of the paper ejection roller pair 3d is stopped. Thus, the document S is held by the paper ejection roller pair 3d without dropping.

The image of the document S read by the document reading section 3c is sent to the recording unit 2, where the image is recorded on the recording medium P by the recording section 2c. The operation of the recording unit 2 is described above. The recorded medium P is accommodated in the accommodating unit 5 without coming into contact with the document S. This prevents the recorded medium P from rubbing to cause image degradation.

Figure 7:
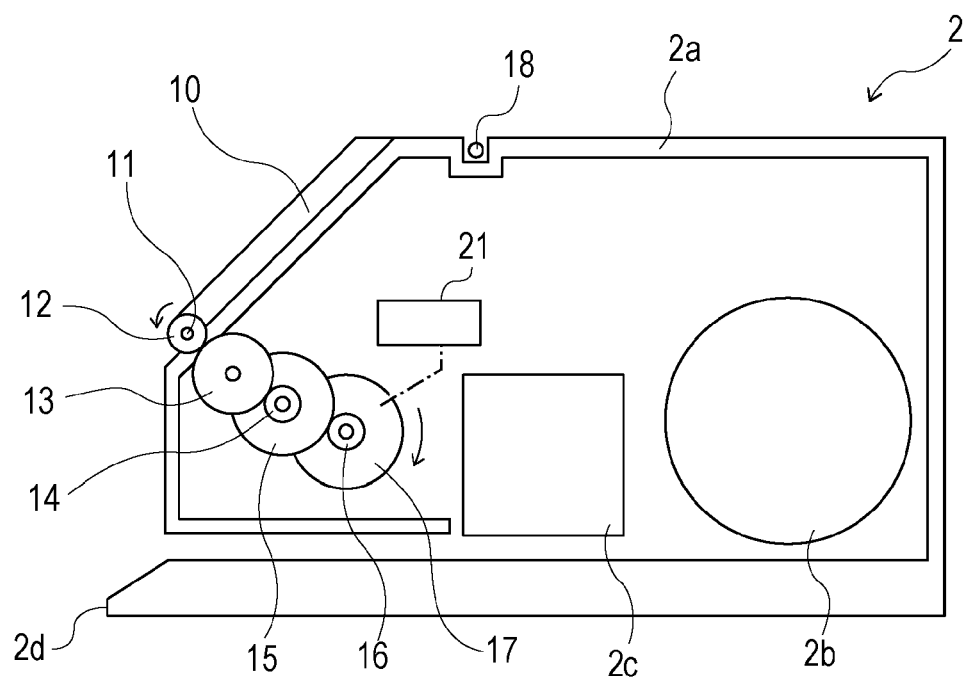
FIG. 7 is a cross-sectional view showing a mechanism for electrically operating the movable member.

The rotating operation of the movable member 10 described above may be performed either manually by the user or electrically. FIG. 7 shows a mechanism for electrically operating the movable member 10. FIG. 7 shows only the recording unit 2 because the reading unit 3 is the same as that in the above embodiment. A gear 12 is provided coaxially with the rotation shaft 11. Rotating the gear 12 makes the movable member 10 rotate about the rotation shaft 11. A gear 13 engages with the gear 12 and a gear 14. The gear 14 and a gear 15 rotate together about a common shaft. A gear 16 is press-fit to the driving shaft of a driving motor 17 and engages with the gear 15. The driving motor 17, and thus the movable member 10, is controlled by a control unit 21. A document sensor 18 is provided on the top surface 2g of the casing 2a of the recording unit 2. The document sensor 18 includes a light-emitting portion and a light-receiving portion, with which it can be determined whether the document S is present on the top surface 2g of the casing 2a.

When the driving motor 17 is rotated in the direction of the arrow (clockwise) under the control of the control unit 21, the gears 12 to 16 are driven in sequence, so that the movable member 10 rotates counterclockwise about the rotation shaft 11. In contrast, when the driving motor 17 is rotated in a direction opposite to the arrow (counterclockwise) under the control of the control unit 21, the movable member 10 rotates clockwise about the rotation shaft 11. The movable member 10 can be rotated to the reference rotational position, the first rotational position, or the second rotational position by the action of the driving motor 17 and the gears 12 to 16 and can be held at the position.

Figure 8:
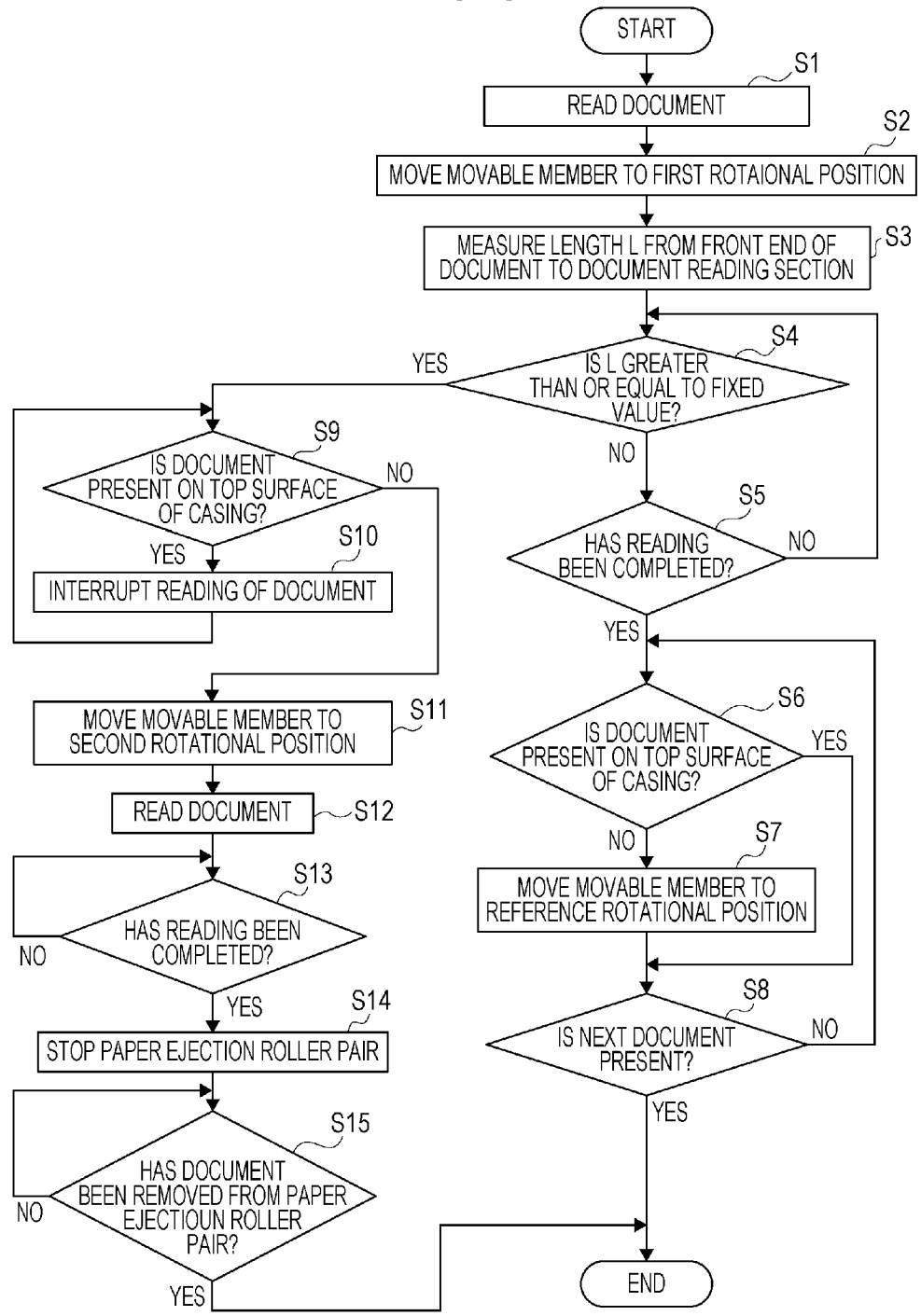
FIG. 8 is a flowchart showing a sequence for electrically operating the movable member.

FIG. 8 is a flowchart showing a sequence for electrically operating the movable member 10. The operation of the above image reading and recording apparatus 1 described above will be described with reference to FIG. 8.

When reading the document S is started at the reading unit 3 (step S1), the control unit 21 moves the movable member 10 so that the discharge path for the document S changes from the reference discharge path 30 to the first discharge path 31 (step S2). Specifically, the driving motor 17 is rotated in the direction of the arrow (clockwise) in FIG. 7, and the movable member 10 at the reference rotational position moves to the first rotational position by the action of the gears 12 to 16.

Subsequently, the reading unit 3 measures a distance from the front end SF of the document S to the document reading section 3c, that is, a length L in the conveying direction of the document S that has passed through the document reading section 3c (step S3). The length L in the conveying direction is not the entire length of the document S itself but the length of a portion of the document S passing through the document reading section 3c. The length L of the document S in the conveying direction is measured by a length measuring unit 40 of the reading unit 3. The length measuring unit 40 may be software installed in the reading unit 3. The length measuring unit 40 calculates the length L in the conveying direction at regular time intervals from a time elapsed from detection of the front end SF of the document S, a document S conveying speed, and so on and transmits the length L to the control unit 21.

The control unit 21 determines whether the length L in the conveying direction has reached a predetermined value (a standard length) (step S4). The predetermined value (the standard length) is a maximum length at which the read document S can be held in a good form on the top surface 2g of the casing 2a of the recording unit 2. A document S longer than the maximum length might not be placed in a good form on the top surface 2g of the casing 2a of the recording unit 2. Specifically, the rear end SE of the document S may slip down to the back of the recording unit 2 or might not move to the right, but the document S may be placed in a folded manner. If the length L in the conveying direction has not reached the predetermined value (a standard length), the document reading operation is continued, and the length L in the conveying direction is monitored.

If the reading has finished without the length L of the document S in the conveying direction reaching the predetermined value (a standard length) (step S5), that is, if the document S itself has such a length that allows the document S to be placed in a good form on the top surface 2g of the recording unit 2, the following steps 6 to 8 are performed. First, the document sensor 18 determines whether a read document S is present on the top surface 2g of the casing 2a (step S6). If a read document S is present on the top surface 2g of the casing 2a, and the next document S is present (step S8), the reading unit 3 waits for the reading of the next document S to start. Since the movable member 10 is not returned to the reference rotational position but is held at the first rotational position, a plurality of documents S can be continuously read and can be continuously discharged onto the top surface 2g of the casing 2a of the recording unit 2. If the read document S is removed by the user, the driving motor 17 is rotated in the direction opposite to the arrow (counterclockwise), so that the movable member 10 is returned to the reference rotational position by the action of the gears 12 to 16. Thereafter, the reading unit 3 waits for the reading of the next document S to start (step S8). When the movable member 10 is to be returned to the reference rotational position, it is determined whether a read document S is present on the top surface 2g of the casing 2a, as described above. This prevents the document S from being damaged.

If at step S4 it is determined that the length L of the document S in the conveying direction has reached the predetermined value (a standard length), that is, if the read document S cannot be placed in a good form on the top surface 2g of the casing 2a of the recording unit 2, the following steps S9 to S15 are performed. First, the document sensor 18 determines whether a read document S is placed on the top surface 2g of the casing 2a (step S9). This is because a read document S on the top surface 2g of the casing 2a, if present, can drop when the movable member 10 is moved to the second rotational position. If it is determined that the document S is placed on the top surface 2g, the reading unit 3 interrupts reading of the document S (step S10).

If the read document S is not resent on the top surface 2g of the casing 2a, the control unit 21 causes the driving motor 17 to rotate in the direction of the arrow (clockwise) and the movable member 10 to move to the second rotational position by the action of the gears 12 to 16 (step S11). The same applies to a case where the read document S is removed by the user. When the discharge path for the document S is changed from the first discharge path 31 to the second discharge path 32, the document reading section 3c continues or resumes reading the document S. If the document S is read to the rear end SE (step S13), the paper ejection roller pair 3d is stopped (step S14) and holds the document S to prevent it from dropping. After the user removes the document S from the paper ejection roller pair (step S15), the reading unit 3 waits for the start of reading the document S.

As described above, the position of the movable member 10 may be determined by the time the front end SF of the document S reaches the rotation shaft 11 of the movable member 10. When the front end SF of the document S reaches the holding portion 19 (the rotation shaft 11) of the movable member 10, the document S begins to deform, causing elastic repulsive force. When the movable member 10 is thereafter moved to the second rotational position, the document S may not be discharged along the second discharge path 32 due to the elastic repulsive force of the document S. Thus, the predetermined value of the length L of the document S in the conveying direction can be determined as a length from the document reading section 3c through the paper ejection roller pair 3d to the holding portion 19 (the rotation shaft 11) of the movable member 10 along the first discharge path 31. In other words, when the length L of the document S in the conveying direction measured by the length measuring unit 40 has reached the above length, and the document S is being read by the document reading section 3c, it can be determined that the length L of the document S in the conveying direction has reached the predetermined value (a standard length). Thus, the movable member 10 is moved to the second rotational position, so that the discharge path for the document S is changed from the first discharge path 31 to the second discharge path 32.

The predetermined value of the length L of the document S in the conveying direction may also be determined as a smaller one of the maximum length at which the document S can be held on the top surface 2g of the recording unit 2 and a length along the first discharge path 31 from the holding portion 19 to the document reading section 3c. When the length L of the document S in the conveying direction has reached the shorter one, the movable member 10 may be moved to the second rotational position, so that the discharge path for the document S can be changed from the first discharge path 31 to the second discharge path 32.

Second Embodiment

Figure 9:
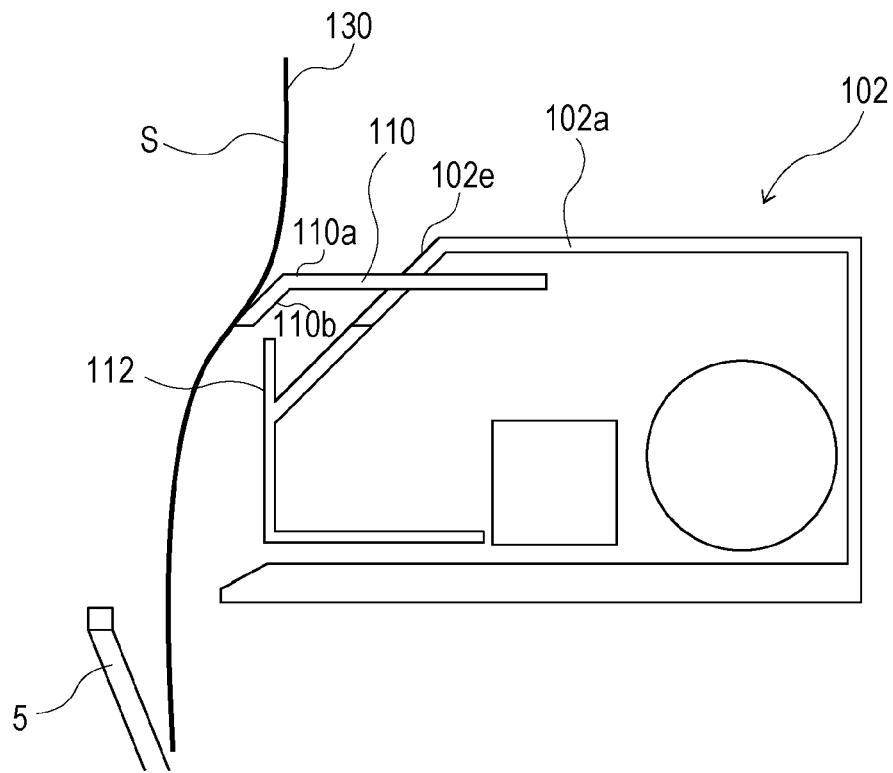
FIG. 9 is a cross-sectional view of a second embodiment, corresponding to FIG. 2.
Figure 10:
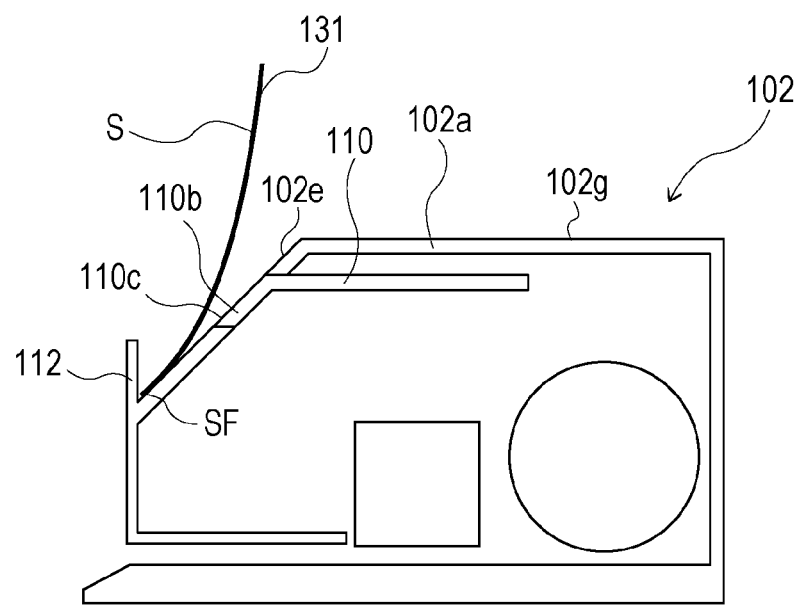
FIG. 10 is a cross-sectional view of the second embodiment, corresponding to FIG. 3.

Referring to FIGS. 9 to 11, an image reading and recording apparatus according to a second embodiment of the present invention will be described. FIGS. 9 to 11 show only a recording unit 102 because the reading unit of this embodiment is the same as that of the first embodiment. The recording unit 102 is covered with a casing 102a and has a holding portion 112 or a stopper on a front surface 102e. A movable member 110 is attached to the recording unit 102 so as to move in a lateral direction among a reference position corresponding to a reference discharge path 130, a first position corresponding to a first discharge path 131, and a second position corresponding to a second discharge path 132. The movable member 110 can be moved substantially in a horizontal direction relative to a casing 102a of the recording unit 102 through the front surface 102e of the casing 102a. The movable member 110 includes a main body 110a that passes through the front surface 102e of the casing 102a and a front edge 110b connected to the main body 110a and coming into contact with the document S. The front edge 110b of the movable member 110 extends obliquely downwards with respect to the main body 110a.

Referring to FIG. 9, the movable member 110 is located at the reference position at which it is drawn partway. The document S discharged from the recording unit 102 is guided to the accommodating unit 5 disposed below the recording unit 102 by the movable member 110 and is accommodated therein. FIG. 9 corresponds to FIG. 2 of the first embodiment.

Referring to FIG. 10, the movable member 110 is at the first position at which it is completely accommodated in the casing 102a of the recording unit 102. An outer surface 110c of the movable member 110 is flush with the front surface 102e of the casing 102a so as not to interfere with the motion of the document S. To that end, the front edge 110b of the movable member 110 is tilted at the same angle as that of the front surface 102e of the recording unit 102. The movable member 110 guides the front end SF of the document S to the stopper 112, so that the front end SF of the document S is in contact with the lowest part of the stopper 112. This state is the same as in FIG. 3 of the first embodiment. The document S is discharged as shown in FIGS. 4 and 5, as in the first embodiment, and is finally placed on a top surface 102g of the casing 102a of the recording unit 102.

Referring to FIG. 11, the movable member 110 is at the second position at which it is drawn to the outermost position. The front end SF of the document S passes by the stopper 112 by the action of the movable member 110 and is guided to the outside of the accommodating unit 5. This state is the same as that in FIG. 6 of the first embodiment.

With the image reading and recording apparatuses according to the embodiments described above, if the length L of the document in the conveying direction has not reached the predetermined value (a standard length), the read document can be placed on the top surface of the casing of the recording unit by the movable member provided at the recording unit. This prevents the read document from coming into contact with a recorded medium, thereby preventing an image recorded on the recording medium from degrading. Also when a plurality of documents are to be continuously read, the documents can be placed on the top surface of the casing of the recording unit, thus improving the operability.

If the length L of the document in the conveying direction has reached the predetermined value (a standard length), the document can be guided to the outside of the accommodating unit that accommodates a recorded medium by moving the movable member. In this case also, the read document discharge path is separated from the recorded medium discharge path by the movable member, thereby preventing the read document from coming into contact with the recorded medium to cause image degradation.

In both cases, there is no need to provide accommodating units (stack trays) only for documents and recording media, respectively, and thus space-saving and simplification of the image reading and recording apparatus can be achieved. Since reading of an image and recording on a recording medium can be processed in parallel, the time required after reading the image until recording it on the recording medium can be reduced.

Although the above embodiments take as examples image reading and recording apparatuses including a recording unit and a reading unit disposed thereabove, the recording unit and the reading unit may be vertically inversed. The present invention can also be applied to, in addition to the recording unit and the reading unit, a plurality-of-sheet processing apparatus (a first processing unit and a second processing unit) that processes a sheet. That is, the first processing unit performs a first process on a first sheet and discharges the first sheet through a first-sheet discharge path. The second processing unit is disposed below the first processing unit, performs a second process on a second sheet, and discharges the second sheet. The sheet processing apparatus operates such that the first-sheet discharge path is selected from a first discharge path in a space between the first processing unit and the second processing unit and a second discharge path on a side of the second processing unit.

Thus, a compact image reading and recording apparatus with a simple configuration can be provided in which a document and a recording medium can be discharged in parallel, and in which an adverse effect on a recorded medium and a read document can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-028074, filed Feb. 18, 2014, which is hereby incorporated by reference herein in its entirety.

What is claimed is:

1. An apparatus for reading and recording an image, the apparatus comprising:
a reading unit configured to read an image of a document while conveying the document and discharge the document downwards by gravitation;
a recording unit located below the reading unit, the recording unit recording the image on a recording medium while conveying the recording medium and discharging the recording medium downwards by gravitation;
a movable member configured to select a discharge way of the document discharged from the reading unit from at least a first discharge way in which the document is discharged into a space between the reading unit and the recording unit and a second discharge way in which the document is discharged to a side of the recording unit; and
a holding portion configured to hold a front end of the document,
wherein the movable member is mounted to the recording unit so as to be movable between a first position corresponding to the first discharge way and a second position corresponding to the second discharge way; and
when the movable member is at the first position, the document is discharged into the space while being deformed, with the front end held by the holding portion, and when the movable member is at the second position, the document is discharged to a side of the recording unit, without the front end restricted.

2. The apparatus according to claim 1, wherein
the movable member is mounted to the recording unit so as to be rotatable about a rotation shaft between the first position and the second position; and
at the first position, the movable member is in an orientation in which the holding portion in a concave shape is formed between the movable member and the recording unit, and at the second position, the movable member is in an orientation in which a front edge of the movable member is located in a direction in which the document is discharged with respect to the rotation shaft.

3. The apparatus according to claim 1,
wherein the holding portion includes a stopper, and the movable member is mounted to the recording unit so as to be movable in a lateral direction between the first position and the second position; and
at the first position, the movable member is at a position at which the front end of the document is guided to the stopper, and at the second position, the movable member is at a position at which the front end of the document passes by the stopper.

4. The apparatus according to claim 1,
wherein the reading unit includes a guide member at an ejecting section; and
wherein the guide member guides the front end of the document toward the movable member, and if the first discharge way is selected, the guide member guides the document so as to push a central portion of the document deep through an inlet of the space between the reading unit and the recording unit.

5. The apparatus according to claim 4, wherein when the first discharge way is selected, the document is placed on a top surface of the recording unit.

6. The apparatus according to claim 1, wherein in the first discharge way, when a length of the document exceeds a length from the holding portion to a document reading section of the reading unit in the first discharge way, the movable member so moves that the discharge way is changed from the first discharge way to the second discharge way.

7. The apparatus according to claim 1, further comprising an accommodating unit located below the recording unit in which the recording medium discharged from the recording unit is accommodated.

8. An apparatus for reading and recording an image, the apparatus comprising:
a reading unit configured to read an image of a document while conveying the document and discharge the document downwards by gravitation;
a recording unit located below the reading unit, the recording unit recording the image on a recording medium while conveying the recording medium and discharging the recording medium downwards by gravitation;
a movable member configured to select a discharge way of the document discharged from the reading unit from at least a first discharge way in which the document is discharged into a space between the reading unit and the recording unit and a second discharge way in which the document is discharged to a side of the recording unit; and
an accommodating unit located below the recording unit in which the recording medium discharged from the recording unit is accommodated, and wherein the discharge way further includes a third discharge way in which the document is discharged into the accommodating unit.

9. The apparatus according to claim 8, wherein
when the reading unit starts to read the document, the movable member moves so that a discharge way of the document is changed from the third discharge way to the first discharge way.

10. An apparatus for reading and recording an image, the apparatus comprising:
a reading unit configured to read an image of a document while conveying the document and discharge the document downwards by gravitation;
a recording unit located below the reading unit, the recording unit recording the image on a recording medium while conveying the recording medium and discharging the recording medium downwards by gravitation; and
a movable member configured to select a discharge way of the document discharged from the reading unit from at least a first discharge way in which the document is discharged into a space between the reading unit and the recording unit and a second discharge way in which the document is discharged to a side of the recording unit,
wherein in the first discharge way, when a length of the document exceeds a maximum length that allows the document to be held on a top surface of the recording unit, the movable member so moves that the discharge way is changed from the first discharge way to the second discharge way.

11. The apparatus according to claim 10, wherein the reading unit includes a document reading section and a length measuring unit configured to measure a length in a conveying direction of the document that has passed through the document reading section.

12. An apparatus for reading and recording an image, the apparatus comprising:
a reading unit configured to read an image of a document while conveying the document and discharge the document downwards by gravitation;
a recording unit located below the reading unit, the recording unit recording the image on a recording medium while conveying the recording medium and discharging the recording medium downwards by gravitation;
a movable member configured to select a discharge way of the document discharged from the reading unit from at least a first discharge way in which the document is discharged into a space between the reading unit and the recording unit and a second discharge way in which the document is discharged to a side of the recording unit; and
a sensor configured to detect whether the document is placed on a top surface of the recording unit.

13. An apparatus for reading and recording an image, the apparatus comprising:
a reading unit configured to read an image of a document while conveying the document and discharge the document downwards by gravitation;
a recording unit located below the reading unit, the recording unit recording the image on a recording medium while conveying the recording medium and discharging the recording medium downwards by gravitation; and
a movable member configured to select a discharge way of the document discharged from the reading unit from at least a first discharge way in which the document is discharged into a space between the reading unit and the recording unit and a second discharge way in which the document is discharged to a side of the recording unit,
wherein the reading unit includes a paper ejection roller pair that ejects the document, the paper ejection roller pair being configured to hold the document when the second discharge path is selected, and reading of the document is completed.

14. A method for reading and recording an image, the method comprising:
reading an image of a document while conveying the document with a reading unit, the document is discharged downwards by gravitation;
recording the image on a recording medium while conveying the recording medium with a recording unit located below the reading unit, the recording medium is discharged downwards by gravitation; and
operating a movable member such that the discharge way of the document is selected from a first discharge way in which the document is discharged to a space between the reading unit and the recording unit, second discharge way in which the document is discharged to a side of the recording unit, and a third discharge way in which the document is discharged into an accommodating unit located below the recording unit.

15. A sheet processing apparatus comprising:
a first processing unit that performs a first process on a first sheet and discharges the first sheet;

a second processing unit disposed below the first processing unit, the second processing unit performing a second process on a second sheet and discharging the second sheet; and an accommodating unit disposed below the second processing unit in which the second sheet discharged from the second unit is accommodated, wherein a discharge way of the first sheet discharged from the first processing unit is selected from a first discharge way in which the first sheet is discharged to a space between the first processing unit and the second processing unit, a second discharge way in which the first sheet is discharged to a side of the second processing unit, and a third discharge way in which the second sheet is discharged into the accommodating unit.

* * * * *